United States Patent
McCleary

(10) Patent No.: US 8,686,892 B2
(45) Date of Patent: Apr. 1, 2014

(54) SYNTHETIC APERTURE RADAR CHIP LEVEL CROSS-RANGE STREAK DETECTOR

(75) Inventor: Brent McCleary, Chino Hills, CA (US)

(73) Assignee: Raytheon Company, Waltham, MA (US)

(*) Notice: Subject to any disclaimer, the term of this patent is extended or adjusted under 35 U.S.C. 154(b) by 216 days.

(21) Appl. No.: 13/204,497

(22) Filed: Aug. 5, 2011

(65) Prior Publication Data

US 2013/0033394 A1 Feb. 7, 2013

(51) Int. Cl.
*G01S 13/00* (2006.01)

(52) U.S. Cl.
USPC ......... 342/25 R; 342/25 F; 342/191; 342/195

(58) Field of Classification Search
USPC ................. 342/25 R–25 F, 159, 162
See application file for complete search history.

(56) References Cited

U.S. PATENT DOCUMENTS

| | | | |
|---|---|---|---|
| 5,184,133 A * | 2/1993 | Tsao | 342/25 F |
| 5,959,566 A * | 9/1999 | Petty | 342/25 B |
| 8,116,522 B1 * | 2/2012 | Buck et al. | 382/103 |
| 2003/0185420 A1 * | 10/2003 | Sefcik et al. | 382/103 |
| 2003/0193335 A1 * | 10/2003 | Patch et al. | 324/307 |
| 2010/0100268 A1 * | 4/2010 | Zhang et al. | 701/25 |
| 2010/0321234 A1 * | 12/2010 | Goldman | 342/25 A |

* cited by examiner

*Primary Examiner* — John B Sotomayor
*Assistant Examiner* — Marcus Windrich
(74) *Attorney, Agent, or Firm* — Christie, Parker & Hale, LLP

(57) ABSTRACT

A method of reducing cross-range streaking in a radar image includes determining a number of on-pixels in each line of at least a portion of the radar image, determining which lines have a determined number of on-pixels that exceeds a threshold number, and removing the on-pixels of lines having the determined number of on-pixels exceeding the threshold number.

17 Claims, 3 Drawing Sheets

SYNTHETIC APERTURE RADAR CHIP LEVEL CROSS-RANGE STREAK DETECTOR

GOVERNMENT RIGHTS

This invention was made with U.S. Government support under contract No. FA8650-08-D-1446 awarded by the Department of Defense. The U.S. Government has certain rights in this invention.

BACKGROUND

The present invention relates to the field of automatic target recognition.

A typical synthetic aperture radar (SAR) automatic target detection/automatic target recognition (ATD/ATR) system may include three stages: a pre-screener/detection stage; a discriminator stage; and a classifier stage.

Stationary targets detected using rotating radar arrays may cause cross-range streaking in the images produced by the SAR, wherein unwanted bright detections/bright pixels/"on" pixels corresponding to the rotation of the radar array are produced in the radar image. Cross-range streaking on the target may cause a decrease in the accuracy of both a position estimate and a pose estimate of the target calculated in the second level discriminator (SLD) of the ATD process. For example, the length, height, and/or width estimates of the target may be corrupted by the cross-range streaking, thereby leading to poor/inaccurate ATD scores.

Prior attempts to deal with SAR target chips/images with cross-range streaks caused by rotating radars include searching all possible pose values to obtain a best match with ATR models or templates. However, such methods may result in longer software run times and a higher rate of false target identification declarations.

Other solutions have included the modeling of cross-range streaks into the ATR models/templates. This solution, however, also typically results in longer software run times, and further requires a larger database.

SUMMARY

The front end of a SAR ATR system will often estimate the pose and position of a potential target, such as a target vehicle. The front end, or ATD stage, passes the target pose and position information to the ATR algorithm, which then uses the information to constrain the pose and position search range during target identification. However, cross-range streaking, such as that caused by rotating radars on a vehicle, can result in incorrect ATD pose and position estimates, which may lead to the ATR producing an incorrect target identification declaration. A SAR chip level cross-range streak detector according to embodiments of the present invention aids the ATD in the process of estimating the pose and position of targets, such as target vehicles.

Embodiments of the present invention detect cross-range streaks in a SAR chip and, if cross-range streaks are found, calculate an improved pose estimation by performing one or more of the following processes:

1) define regions on the SAR chip where cross-range streaking will be checked;

2) threshold a magnitude/power chip to form a bi-level output chip (e.g., a binary cluster image comprising "on" pixels and "off" pixels corresponding to the SAR chip), and use these detected pixels to create target pixel clusters (this process can be combined with the ATD SLD thresholding and clustering steps, discussed below);

3) form a cross-range profile/histogram of cross-range bright pixels counts (e.g., the number of "on" pixels per chip line/row, which is done by a simple count of the number of pixels set "on" within each line/row/section of a corresponding target pixel cluster);

4) filter the cross-range profile (e.g., using a low pass filter);

5) threshold the cross-range profile, whereby rows having a cross-range bright pixels count exceeding the threshold are categorized as potential streaks/problem areas (this threshold may be determined empirically);

6) test for minimum and/or maximum range-wise thicknesses of any potential cross-range detected streaks; and 7) if the test from step 6 is satisfied, exclude the identified pixels corresponding to the cross-range detected streaks from bounding box calculations. The identified pixels may also be excluded from the SLD feature computations, while the unmodified magnitude/power chip may be still passed to the ATR.

One embodiment of the present invention provides a method of reducing cross-range streaking in a radar image, the method including determining a number of on-pixels in each line of at least a portion of the radar image, determining which lines have a determined number of on-pixels that exceeds a threshold number, and removing the on-pixels of lines having the determined number of on-pixels exceeding the threshold number.

Determining the number of on-pixels in each line of at least a portion of the radar image may include forming a target profile histogram and filtering the target profile histogram.

Filtering the target profile histogram may include passing the target profile histogram through a low pass filter.

Determining which lines have the determined number of on-pixels exceeding the threshold number may include determining a largest gradient of the target profile histogram and determining a thickness of the largest gradient of the target profile histogram.

Removing the on-pixels of lines having the determined number of on-pixels exceeding the threshold number may include removing the on-pixels corresponding to the largest gradient when the thickness meets a threshold streak thickness.

Determining the largest gradient of the target profile histogram may include incrementally varying a pose angle through a range of 90 degrees and determining a maximum gradient of the target profile histogram on a projection axis and on an axis perpendicular to the projection axis at each of increments corresponding to the range of 90 degrees.

The lines of the at least a portion of the radar image may correspond to horizontal rows of the at least a portion of the radar image.

The method may further include forming a modified binary cluster after removing the on-pixels of lines having the determined number of on-pixels exceeding the threshold number, determining a best fit of a rotating bounding box around a leading edge of the modified binary cluster, and determining a pose estimate and determining a position estimate corresponding to the determined best fit.

Determining the pose estimate may include computing length and width features of the binary cluster, wherein the computed length may correspond to a direction corresponding to a peak range of histogram bins.

Removing the on-pixels of lines having the determined number of on-pixels exceeding the threshold number may include replacing the on-pixels with pixel values determined from other regions of the radar image.

The method may further include receiving an unmodified radar image, converting pixel data of the unmodified radar image into a binary cluster, forming target pixel clusters corresponding to the binary cluster, and analyzing the target pixel clusters as the at least a portion of the radar image.

The method may further include forming a modified image corresponding to the removed on-pixels, computing one or more attributes of a potential target corresponding to the modified image, and categorizing the potential target corresponding to the computed attributes using automated target recognition.

Another embodiment of the present invention provides a method of improving radar image analysis, the method including defining regions on a synthetic aperture radar (SAR) chip to be analyzed for cross-range streaking, thresholding a magnitude chip corresponding to the defined regions, forming a bi-level output chip corresponding to the thresholded magnitude chip and including on-pixels and off-pixels, forming target pixel clusters including one or more of the on-pixels and corresponding to a potential target, determining a number of the on-pixels in each of a plurality of sections of the target pixel clusters, forming a cross-range profile corresponding to the determined number of on-pixels of each section, filtering the cross-range profile, thresholding the cross-range profile by categorizing sections having the determined number of on-pixels above a threshold value as potential problem areas, testing the potential problem areas for at least one of minimum and maximum parameters, and excluding pixels corresponding to the potential problem areas determined to be beyond at least one of the minimum or maximum parameters.

Yet another embodiment of the present invention provides a method of automated target detection, the method including downsampling radar data, converting the downsampled radar data to a square-root-of-magnitude format, identifying potential target pixels corresponding to local brightness, clustering the potential target pixels to form regions of interest, thresholding chip pixels corresponding to the regions of interest to determine which chip pixels correspond to a target, clustering the thresholded chip pixels to create a binary cluster, circumscribing the binary cluster, computing length and width features of the binary cluster, generating a joint feature discriminator score corresponding to the computed length and width features, and categorizing a target detection corresponding to the joint feature discriminator score and at least one of an automatic target recognition model and an automatic target recognition template.

The potential target pixels may be identified using a classical Goldstein two-parameter constant false alarm rate method.

Circumscribing the binary cluster may include determining a best fit of a bounding box around a leading edge of the binary cluster, and wherein the length and width features are computed corresponding to the determined best fit.

Determining the best fit of a rotating bounding box around the leading edge of the binary cluster may include determining a number of pixels at each integer coordinate value on a projection axis of a target profile histogram, determining a largest gradient of the target profile histogram corresponding to the determined number of pixels, and removing pixels corresponding to the largest gradient if the largest gradient meets a threshold thickness value.

The joint feature discriminator score may be used to determine whether the regions of interest belong to a target population or clutter population.

Accordingly, embodiments of the present invention may provide: simple, real-time means of determining target cross-range streaks on a chip-by-chip/image-by-image basis in SAR images; estimations of pose and position of a target corresponding to an image with cross-range streak pixels removed; SAR chip data that needs no modification before being passed on to the ATR algorithm; ATR pose and position search regions that don't need to be increased; and an ATR model/template database that does not need to be increased.

BRIEF DESCRIPTION OF THE DRAWINGS

The accompanying drawings, together with the specification, illustrate exemplary embodiments of the present invention, and, together with the description, serve to explain aspects of embodiments of the present invention. The above and other features and aspects of the present invention will become more apparent by describing in detail exemplary embodiments thereof with reference to the attached drawings, in which.

DETAILED DESCRIPTION

Figure 2:
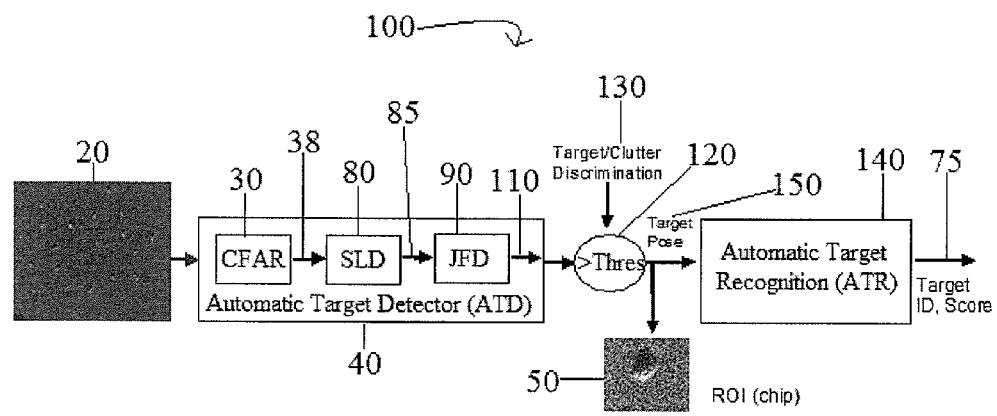
FIG. 2 is a block diagram of an overall ATD/ATR process according to an embodiment of the present invention.
Figure 5:
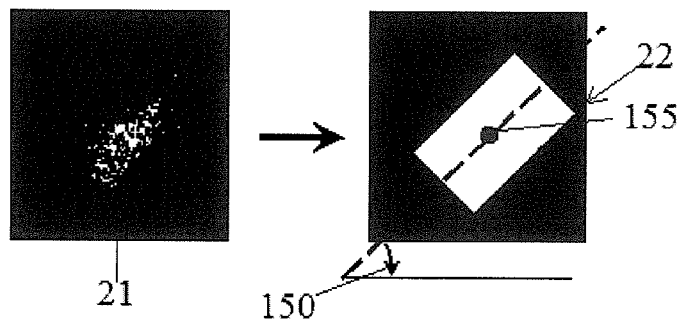
FIG. 5 is an example of a cluster threshold chip/binary cluster image (left) and a bounding box for the cluster threshold chip (right) used to estimate pose and position according to an embodiment of the present invention.
Figure 6:
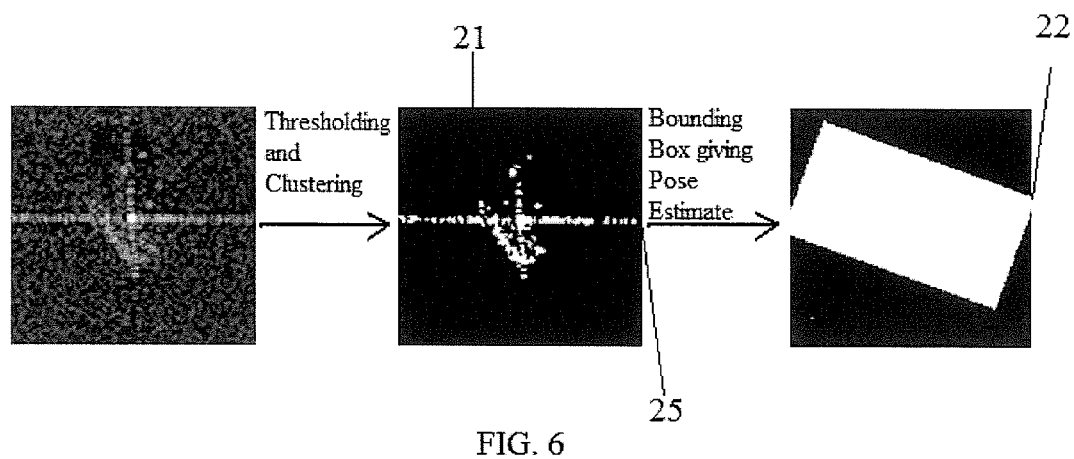
FIG. 6 is an example of a radar image (left) that is thresholded and clustered to produce a binary cluster image (middle) used to derive a bounding box (right) for a chip with cross-range streaking according to an embodiment of the present invention.

Referring to FIG. 2, ATR systems 100 may require that the ATD 40 meets a defined minimum probability of correctly estimating a target pose 150 (see FIG. 5) within a predefined angle range. In the presence of cross-range streaking 25 on the target (see FIG. 6), the pose estimate 150 calculated in the SLD stage 80 can have poor accuracy. Additionally, the SLD 80 feature estimates 85, such as length and width estimates, can also be corrupted by the cross-range streaking 25. An example of the effects of cross-range streaking 25 on the SLD 80 is shown in FIG. 6, wherein cross-range streaking 25 has resulted in a bounding box 22 with a poor/inaccurate pose angle 150, thereby also causing poor target length and width estimations 85. FIG. 6 shows cross-range streaking 25 caused by a bright return point (e.g., caused by a corner reflector) on the target, as opposed to cross-range streaking 25 due to a mounted rotating radar, although embodiments of the present invention are not limited thereto.

Embodiments of the present invention provide a SAR ATR 100 capable of reducing or eliminating cross-range streaks 25, such as those caused by rotating radar, thereby decreasing the probability of false target identification declarations.

Figure 1:
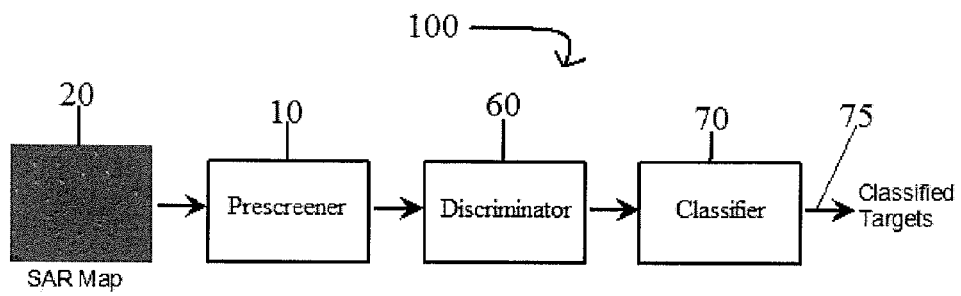
FIG. 1 is a block diagram of a three-stage SAR ATD/ATR system according to an embodiment of the present invention.

Referring to FIG. 1, the pre-screener/detection stage 10 of a SAR ATR 100 according to an embodiment of the present invention selects candidate target pixels in a subject radar image/SAR chip/SAR map/SAR image pixel data 20 based on local brightness (e.g., the number/intensity of "on" pixels). This functionality may be performed in a constant false alarm rate (CFAR) stage 30 (see FIGS. 2 and 3) of the ATD process 40, according to embodiments of the present invention. Bright detections (e.g., "on" pixels) corresponding to the SAR map 20 in target-size regions are clustered/grouped and passed on for analysis as regions of interest (ROIs) 50.

The discriminator stage 60 analyzes the ROIs/ROI chips 50, and attempts to reject clutter false alarms while accepting real/accurately represented targets. This process in the discriminator stage 60 reduces a computational load of the classifier stage 70 in an ATR system 100. This functionality of selectively accepting targets is performed in the SLD stage 80 and the joint feature discriminator (JFD) stage 90 of the ATD process 40, wherein ROI 50 features are calculated and used to produce a JFD/joint likelihood score 110.

Finally, the classifier stage 70 rejects clutter false alarms, and also classifies/categorizes target detections 75, such as by vehicle type. The classifier functionality is performed in the ATR stage 140 of the ATD/ATR process 100, which may use model-based or template-based matching.

Figure 3:
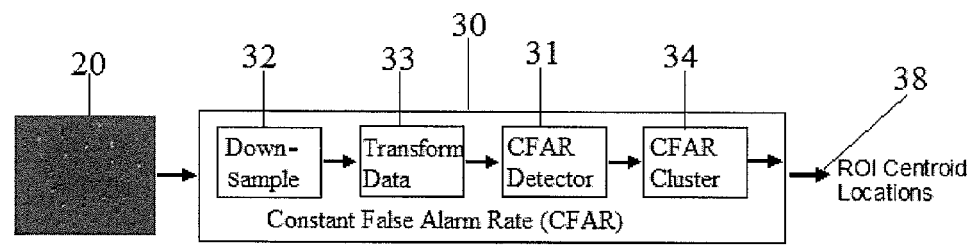
FIG. 3 is a block diagram of a constant false alarm rate (CFAR) stage according to the embodiment shown in FIG. 2.

Referring to FIGS. 2 and 3, the CFAR detector stage 31 of the CFAR stage 30 may screen out much of the information corresponding to the radar image 20, so that only data corresponding to possible targets/regions of interest 50 are passed on for further analysis.

First, according to one embodiment of the present invention, downsampling 32 of the SAR image pixel data 20 is performed, which reduces the amount of processing that is required in the following stages. Next, the SAR image pixel data 20 is converted/transformed from its input format to square-root-of-magnitude format 33. The mapping in this stage 33 causes the target/clutter to have a Gaussian-like probability distribution. Potential target pixels of the SAR image pixel data 20 are then identified in the CFAR detector stage 31, for example, by using a classical Goldstein two-parameter CFAR method. The final stage 34 of the CFAR stage 30 is the clustering of pixels. A single target can produce multiple CFAR detections, so detections in common target size regions are grouped together.

Figure 4:
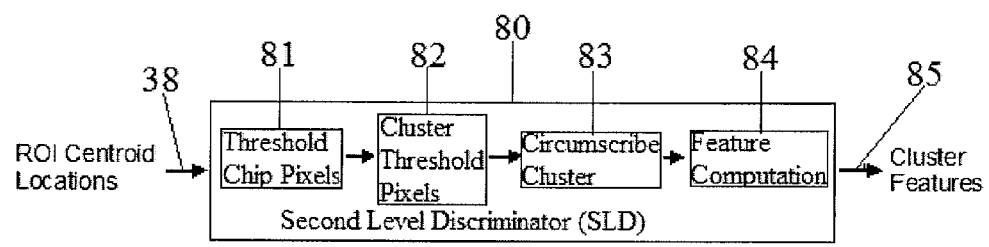
FIG. 4 is a block diagram of a SLD stage according to the embodiment shown in FIG. 2.

Referring to FIG. 4, the SLD 80 extracts several features (e.g., "cluster features" 85) from the ROI chips 50 determined by the CFAR detector stage 31. According to embodiments of the present invention, a chip pixel thresholding 81 is performed using the mean and standard deviation of the pixel data grayscale chip corresponding to ROI centroid locations 38. A threshold is computed 81 to determine which pixels in the chip 38 belong to the target. Two separate rounds of clustering and small cluster size removal are performed in the "Cluster Threshold Pixels" stage 82 of the SLD stage 80. Bi-level chip/binary segmentation 21 (see FIGS. 5-7) is formed through thresholding 81 and clustering 82.

In the "Circumscribe Cluster" stage 83, the SLD 80 circumscribes and finds the best fit of a rotating rectangle/bounding box 22 around the leading edge of the binary cluster 21. The binary cluster 21 is defined by, for example, the (X,Y) coordinate list of "on" pixels (shown in white in the black and white binary clusters 21 shown in FIGS. 5-7) as determined by the "Threshold Chip Pixels" stage 81 and the "Cluster Threshold Pixel" stage 82. The SAR map 20 direction/orientation determines the leading edge of the target. Referring to FIG. 5, the pose/orientation 150 of the rectangle 22, estimated based upon a bounding box 22 calculation with 180 degree ambiguity, is determined by a steepest/largest/maximum gradient 24 of the projected target profile histogram 23 (see FIG. 7) of the binary silhouette 21 in near-range.

Figure 7:
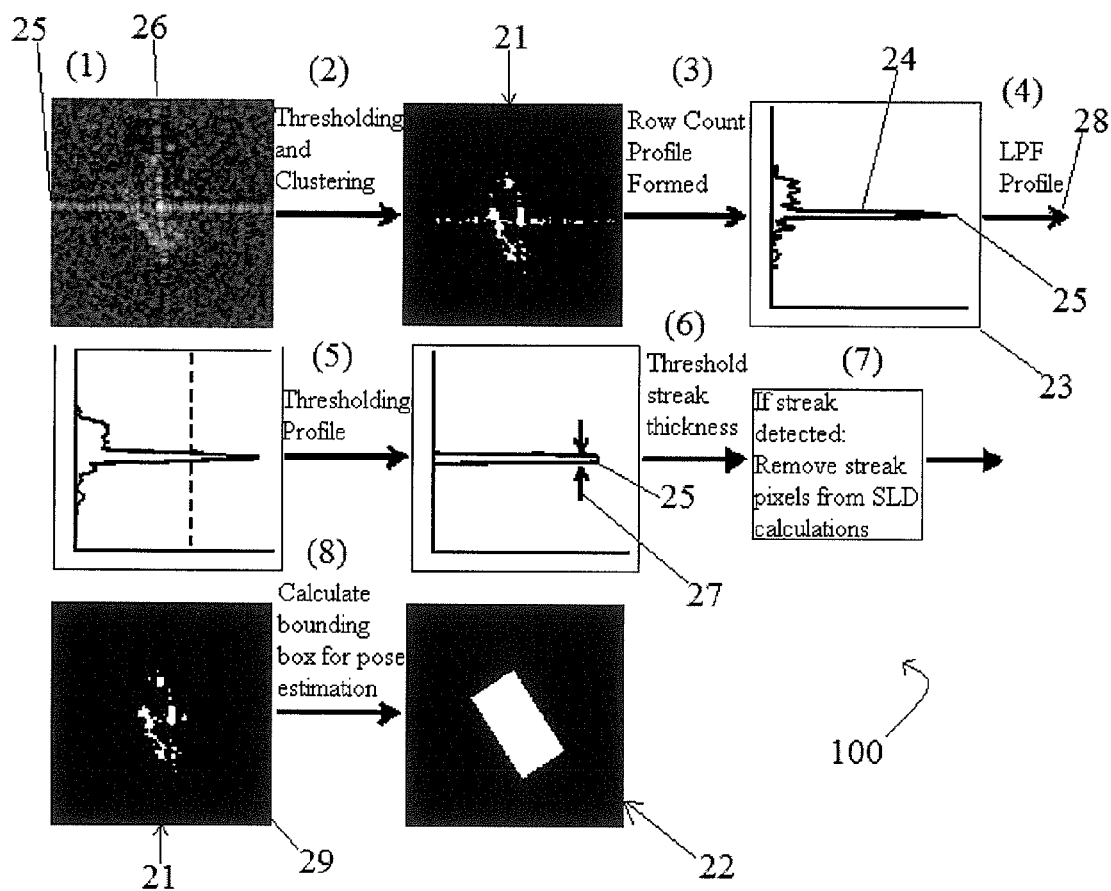
FIG. 7 is a block diagram depicting a method of a chip cross-range streak detector according to an embodiment of the present invention.

In determining a bounding box 22, which is used to estimate target pose 150 and location/position 155, the best fit of a rotating bounding box 22 around the target binary cluster 21 is determined using the steepest gradient 24 in the projected target profile histogram 23. This is done by projecting the target pixels of the binary cluster 21 onto a projection axis, which is at a rotation angle relative to the SAR map 20 X-Y coordinate system. This target profile histogram 23 consists of the number of "on" pixels that are at each integer coordinate value on the projection axis (e.g., the number of "on" pixels in each row of the binary cluster 21). In one embodiment of the present invention, the rotation (pose) angle 150 is varied through a range of 90 degrees, in 1 degree increments. At each value of the rotation (pose) angle 150, the steepest gradient 24 of the target profile histogram 23 is calculated for both the projection axis and an axis perpendicular to it (thus eliminating the need to vary the rotation angle through a range of 180 degrees while calculating the gradient for only a single axis). The length of the target vehicle may be distinguished from the width by determining a direction corresponding to a greater range of histogram bins. The pose (orientation) angle 150 of the target may be measured, for example, in a counterclockwise manner from the Y-axis. Once the pose angle 150 that provides the steepest gradient 24 is estimated, a bounding box 22 aligned to the calculated pose angle 150 around the target pixels of the binary cluster 21 is determined. Sample bounding boxes 22 derived from binary clustered pixel data 21 are shown in FIGS. 5, 6, and 7. The target pose estimate 150 is passed on to the ATR algorithm of the ATR stage 140, as shown in FIG. 2.

Referring to FIG. 4, the SLD stage 80 computes a set of cluster features 85 (such as length and width) in the "Feature Computation" stage 84 corresponding to the information provided by the "Circumscribe Cluster" stage 83, and these features 85 are used in the JFD stage 90 for generating a joint likelihood score 110 for each target. This joint likelihood score 110 then has a threshold applied (operating point) 120 to indicate whether or not the ROI 50 being tested belongs to a target population or clutter population (e.g., as determined in "Target/Clutter Discrimination" stage 130, as shown in FIG. 2). Target ROI 50 location estimates 155 and pose estimates 150 may be saved for processing by the ATR stage 140.

A "chip cross-range streak detector" method according to an embodiment of the present invention is depicted in FIG. 7. The algorithm process steps for the method include: (1) define regions on the SAR chip 20 where cross-range streaking 25 will be checked; (2) threshold the magnitude chip/power chip 26 to form a bi-level output chip/binary cluster 21 by using detected pixels to create target pixel clusters 21 (in embodiments of the present invention, this process may be combined with the thresholding and clustering stages 81 and 82 of the ATD SLD stage 80); (3) form a cross-range profile/target profile histogram 23 of the cross-range bright pixels counts by counting of the number of pixels set "on" within each row (for example, the number of "on" pixels may correspond to the X-axis of the histogram 23, and each chip row may correspond to the Y-axis of the histogram 23); (4) low pass filter (LPF) 28 the cross-range profile 23; (5) identify chip rows (e.g., at each integer coordinate value on the projection axis) that have cross-range bright pixel counts exceeding a set threshold 120 as potential streaks 25 (the threshold 120 may be determined empirically, and an example threshold value may be 0.4); (6) test for minimum and maximum range-wise thickness 27 of any cross-range detected streaks 25; (7) if the test from step 6 is satisfied, the identified pixels corresponding to the cross-range detected streaks 25 are excluded from the bounding box 22 calculations, and may also be excluded from the SLD "Feature Computation" stage 84; and (8) calculate the bounding box 22 for pose estimation.

According to embodiments of the present invention, the unmodified magnitude/power chip 26 may also be passed to the ATR 140.

After the completion of the above steps, according to embodiments of the present application, the following actions may be taken: the target chip 26 and improved pose estimation 150 may be passed on to the ATR 140 without modification to the target chip 26 (as shown in FIG. 2); the target chip 26 may have the streak 25 identified pixels values replaced with values determined from other regions of the chip 26, and the modified target chip 29 and improved pose estimation 150 may then be passed on to the ATR 140; and/or the unmodified target chip 26 and improved pose estimation 150 may be passed on to the ATR 140 along with information on the amount of "streak corrupted" pixels 25 that the chip 26 contains, which may be used by the ATR stage 140 to ignore a percentage of the target chip pixels in the matching calculations.

The "chip cross-range streak detector" method of embodiments of the present invention improves the ATR identification (e.g., vehicle identification) of targets that have rotating radar antennas. Experimental data indicates that PID percentage improvement (not difference) of an ATR system 100 using the "chip cross-range streak detector" algorithm of an embodiment of the present invention over the baseline improvement relative to performance without the algorithm applied is 0% for targets without cross-range streaking, but 32% for targets with cross-range streaking.

While the present invention has been particularly shown and described with reference to exemplary embodiments thereof, it will be understood by those of ordinary skill in the art that features of different embodiments may be combined to form further embodiments, and that various changes in form and details may be made therein, without departing from the spirit and scope of the present invention as defined by the following claims and their equivalents.

What is claimed is:

1. A method of using a processor for reducing cross-range streaking in a radar image, the method comprising:
    determining a number of on-pixels in each line of at least a portion of the radar image;
    determining which lines have a determined number of on-pixels that exceeds a threshold number; and
    removing all of the on-pixels of lines having the determined number of on-pixels exceeding the threshold number.

2. The method of claim 1, wherein determining the number of on-pixels in each line of at least a portion of the radar image comprises:
    forming a target profile histogram; and
    filtering the target profile histogram.

3. The method of claim 2, wherein filtering the target profile histogram comprises passing the target profile histogram through a low pass filter.

4. The method of claim 2, wherein determining which lines have the determined number of on-pixels exceeding the threshold number comprises:
    determining a largest gradient of the target profile histogram, which corresponds to the line of the at least a portion of the radar image having a largest number of the on-pixels, by incrementally varying a pose angle of the target profile histogram through a range of 90 degrees, and determining a maximum gradient of the target profile histogram on a projection axis and on an axis perpendicular to the projection axis at each of increments corresponding to the range of 90 degrees; and
    determining a thickness of the largest gradient of the target profile histogram.

5. The method of claim 4, wherein removing the on-pixels of lines having the determined number of on-pixels exceeding the threshold number comprises removing the on-pixels corresponding to the largest gradient when the thickness of the largest gradient meets a threshold value.

6. The method of claim 1, wherein the lines of the at least a portion of the radar image correspond to horizontal rows of the at least a portion of the radar image.

7. The method of claim 1, further comprising:
    forming a modified binary cluster of the radar image by removing the on-pixels of lines having the determined number of on-pixels exceeding the threshold number;
    determining a best fit of a rotating bounding box around a leading edge of the modified binary cluster; and
    determining a pose estimate and determining a position estimate corresponding to the determined best fit.

8. The method of claim 7, wherein determining the pose estimate comprises:
    computing length and width features of the binary cluster, wherein the computed length corresponds to a direction corresponding to a peak range of histogram bins.

9. The method of claim 1, wherein removing the on-pixels of lines having the determined number of on-pixels exceeding the threshold number comprises replacing the on-pixels with pixel values determined from other regions of the radar image.

10. The method of claim 1, further comprising:
    receiving an unmodified radar image;
    converting pixel data of the unmodified radar image into a binary cluster;
    forming target pixel clusters corresponding to the binary cluster; and
    analyzing the target pixel clusters as the at least a portion of the radar image.

11. The method of claim 1, further comprising:
    forming a modified image corresponding to the removed on-pixels;
    computing one or more attributes of a potential target corresponding to the modified image; and
    categorizing the potential target corresponding to the computed attributes using automated target recognition.

12. A method of using a processor for improving radar image analysis, the method comprising:
    defining regions on a synthetic aperture radar (SAR) image pixel data to be analyzed for cross-range streaking;
    thresholding a magnitude image pixel data corresponding to the defined regions;
    forming a bi-level output image pixel data corresponding to the thresholded magnitude image pixel data and comprising on-pixels and off-pixels;
    forming target pixel clusters comprising one or more of the on-pixels and corresponding to a potential target;
    determining a number of the on-pixels in each of a plurality of sections of the target pixel clusters;
    forming a cross-range profile corresponding to the determined number of on-pixels of each section;
    filtering the cross-range profile;
    thresholding the cross-range profile by categorizing sections having the determined number of on-pixels above a threshold value as potential problem areas;
    testing the potential problem areas for at least one of minimum and maximum parameters; and
    excluding pixels corresponding to the potential problem areas determined to be beyond at least one of the minimum or maximum parameters.

13. A method of using a processor for automated target detection, the method including comprising:
- downsampling radar data;
- converting the downsampled radar data to a square-root-of-magnitude format;
- identifying potential target pixels corresponding to local brightness;
- clustering the potential target pixels to form regions of interest;
- thresholding pixels of a radar image corresponding to the regions of interest to determine which ones of the pixels correspond to a target;
- clustering the thresholded pixels to create a binary cluster;
- circumscribing the binary cluster;
- computing length and width features of the binary cluster;
- generating a joint feature discriminator score corresponding to the computed length and width features; and
- categorizing a target detection corresponding to the joint feature discriminator score and at least one of an automatic target recognition model and an automatic target recognition template.

14. The method of claim 13, wherein the potential target pixels are identified using a classical Goldstein two-parameter constant false alarm rate method.

15. The method of claim 13, wherein circumscribing the binary cluster comprises determining a best fit of a bounding box around a leading edge of the binary cluster, and
- wherein the length and width features are computed corresponding to the determined best fit.

16. The method of claim 15, wherein determining the best fit of a rotating bounding box around the leading edge of the binary cluster comprises:
- determining a number of pixels at each integer coordinate value on a projection axis of a target profile histogram;
- determining a largest gradient of the target profile histogram corresponding to the determined number of pixels; and
- removing pixels corresponding to the largest gradient if the largest gradient meets a threshold value.

17. The method of claim 13, wherein the joint feature discriminator score is used to determine whether the regions of interest belong to a target population or clutter population.

* * * * *